United States Patent
Wilson et al.

(10) Patent No.: US 8,281,951 B2
(45) Date of Patent: Oct. 9, 2012

(54) ELECTRICAL COMPONENT ENCLOSURE

(75) Inventors: Rhonda L. Wilson, Monmouth, OR (US); Kevin Parsons, Wilsonville, OR (US)

(73) Assignee: Leviton Manufacturing Co., Inc., Melville, NY (US)

( * ) Notice: Subject to any disclaimer, the term of this patent is extended or adjusted under 35 U.S.C. 154(b) by 308 days.

(21) Appl. No.: 12/580,115

(22) Filed: Oct. 15, 2009

(65) Prior Publication Data

US 2011/0090667 A1    Apr. 21, 2011

(51) Int. Cl.
*B65D 88/52* (2006.01)

(52) U.S. Cl. ............ 220/567.2; 211/133.2; 248/309.1; 439/649; 361/679.58

(58) Field of Classification Search .......... 211/40, 211/133.2, 187, 59.3, 85.1; 248/675, 672, 248/146, 309.1, 67.7, 314; 52/239; 439/65, 439/668, 607.01, 649, 598; 361/679.21, 361/679.26, 679.27, 679.54, 679.22, 679.58, 361/679.55, 679.32, 679.57, 679.08, 679.39; 174/559, 50, 58, 53, 57, 355, 369; 220/567.2, 220/553

See application file for complete search history.

(56) References Cited

U.S. PATENT DOCUMENTS

| | | | |
|---|---|---|---|
| 3,633,075 A | 1/1972 | Hawkins | |
| 4,096,884 A | 6/1978 | Horowitz | |
| 4,427,863 A | 1/1984 | Fujita | |
| 4,485,283 A | 11/1984 | Hurtle | |
| 4,675,987 A | 6/1987 | Minks et al. | |
| 4,835,502 A | 5/1989 | Minnette | |
| 5,192,227 A | 3/1993 | Bales | |
| 5,258,889 A | 11/1993 | Belanger, Jr. | |
| 5,338,908 A | 8/1994 | Rahman et al. | |
| 5,360,129 A | 11/1994 | Lee | |
| 5,574,624 A | 11/1996 | Rennie et al. | |
| 5,773,755 A | 6/1998 | Iwatare | |
| 5,853,091 A * | 12/1998 | Luenser | 211/40 |
| 5,933,319 A | 8/1999 | Buckner et al. | |
| 6,000,179 A * | 12/1999 | Musculus et al. | 52/239 |
| 6,002,313 A | 12/1999 | Mrenna et al. | |
| 6,037,555 A | 3/2000 | Castonguay et al. | |
| 6,088,219 A | 7/2000 | Yanniello et al. | |
| 6,188,036 B1 | 2/2001 | Arnold | |
| 6,198,063 B1 | 3/2001 | Kramer | |
| 6,222,147 B1 | 4/2001 | Doughty et al. | |
| 6,232,855 B1 | 5/2001 | Malingowski et al. | |

(Continued)

FOREIGN PATENT DOCUMENTS

EP    0039869 A1    4/1981

(Continued)

OTHER PUBLICATIONS

International Search Report and Written Opinion for PCT Application No. PCT/US2009/061367, dated May 24, 2010, 11 pages.

(Continued)

*Primary Examiner* — Hung Duong (74) *Attorney, Agent, or Firm* — Marger Johnson & McCollom PC (57) ABSTRACT

A system, including an enclosure and a module, where the module is disposed in the enclosure such that a tab of the enclosure is disposed in a slot of the module; and the module is configured to rotate about the slot. The enclosure can also be configured to receive modular mounting structures. The enclosure can also include multiple panels that create a smaller opening.

24 Claims, 6 Drawing Sheets

U.S. PATENT DOCUMENTS

| | | |
|---|---|---|
| 6,262,880 B1 | 7/2001 | Fischer et al. |
| 6,295,930 B1 | 10/2001 | Kume et al. |
| 6,614,339 B2 | 9/2003 | Parry et al. |
| 6,670,729 B2 | 12/2003 | Novinsky et al. |
| 6,762,389 B1 | 7/2004 | Crooks et al. |
| 6,838,962 B2 | 1/2005 | Leone et al. |
| 6,897,760 B2 | 5/2005 | Kawata et al. |
| 6,924,721 B2 | 8/2005 | Afshari et al. |
| 7,009,132 B1 | 3/2006 | Shea et al. |
| 7,034,241 B2 | 4/2006 | Fleege et al. |
| 7,034,242 B1 | 4/2006 | Shea et al. |
| 7,286,340 B2 | 10/2007 | Karim et al. |
| 7,324,332 B1 | 1/2008 | Shelton |
| 7,342,325 B2 | 3/2008 | Rhodes |
| 7,405,923 B2 | 7/2008 | Kelly et al. |
| 7,460,360 B2 | 12/2008 | Schomaker et al. |
| 7,468,883 B2 | 12/2008 | Mann |
| 7,488,915 B2 | 2/2009 | Pollitt et al. |
| 7,538,645 B2 | 5/2009 | Nishi et al. |
| 7,558,052 B1 | 7/2009 | Coomer et al. |
| 7,635,052 B2 * | 12/2009 | Ceballos-Godefroy et al. ............ 190/103 |
| 7,843,682 B2 | 11/2010 | Leinen et al. |
| 8,118,601 B2 * | 2/2012 | Busse .............................. 439/65 |
| 2004/0065024 A1 * | 4/2004 | Kottman ........................ 52/36.5 |
| 2007/0235625 A1 * | 10/2007 | Liang et al. ................... 248/675 |
| 2009/0179010 A1 | 7/2009 | Asokan et al. |
| 2009/0185336 A1 | 7/2009 | Karim et al. |
| 2011/0067988 A1 | 3/2011 | Elliott et al. |

FOREIGN PATENT DOCUMENTS

| | | |
|---|---|---|
| JP | 06-096656 A | 4/1994 |
| JP | 08-138514 A | 5/1996 |
| KR | 20-1998-0042913 U | 9/1998 |
| KR | 10-2006-009487 A | 8/2006 |
| KR | 10-0693704 B1 | 3/2007 |

OTHER PUBLICATIONS

International Preliminary Report on Patentability for PCT Application No. PCT/US 2009/061367, dated Apr. 26, 2011, 5 pages.

* cited by examiner

ELECTRICAL COMPONENT ENCLOSURE

BACKGROUND

Enclosures can be used for electrical components such as relays, control circuitry, and the like. Within such enclosures, wiring to various components, such as some low voltage or communication wiring, can be located in hard to reach locations. For example, terminals for such wiring can be obscured by various panels of the enclosure.

In addition, various panels, doors, and the like forming the enclosure can be large, bulky, irregularly shaped, or the like. As a result, multiple individuals may be required to properly position and fasten the panels during installation. Furthermore, such panels can be removed merely by removing exposed fasteners on the enclosure.

Moreover, in such enclosures, the electrical components are installed individually. For example, relays, circuit breakers, or the like are installed one by one. Thus, a significant amount of labor is involved in assembly and installation of electrical component enclosures.

DETAILED DESCRIPTION

Embodiments will be described with reference to the drawings. In particular, embodiments will be described where assembly, maintenance, repair, or the like of an electrical component enclosure can be simplified.

Figure 1:
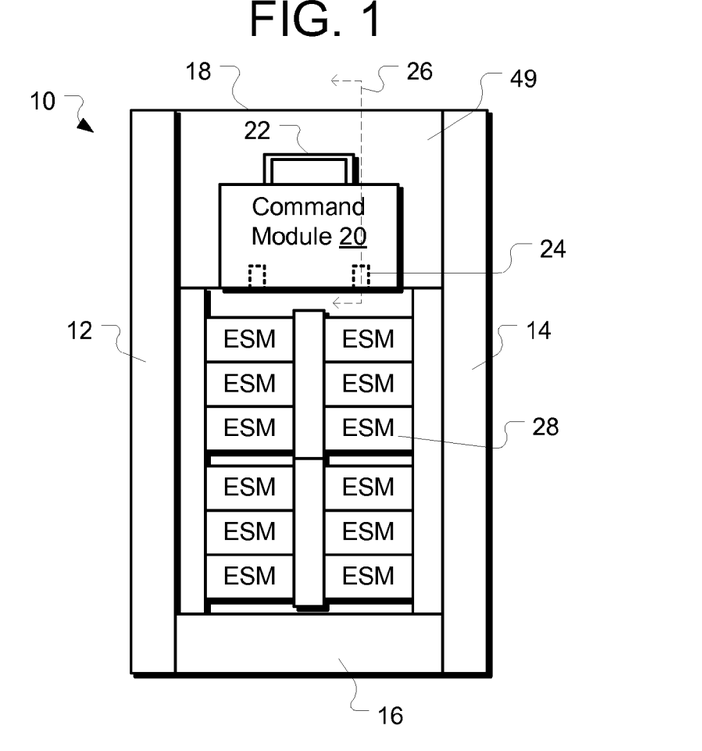
FIG. 1 illustrates an embodiment of an electrical component enclosure according to some inventive principles of this patent disclosure.

FIG. 1 illustrates an embodiment of an electrical component enclosure according to some inventive principles of this patent disclosure. In an embodiment, the enclosure 10 can include the collection of panels, doors, mounting structures, or the like for various components to be installed in the enclosure 10. For example, the enclosure 10 includes a tub 18, panels 12, 14, and 16, and a door (not illustrated). The electrical components can include electrical switching modules 28 such as relays and circuit breakers, a command module 20, communication interfaces, or the like.

In an embodiment, the enclosure 10 includes a command module 20. The command module 20 can be a system configured to control the electrical switching modules 28, interface with the electrical switching modules 28, or the like. In another embodiment, the command module 20 can be configured to provide an interface to systems outside of the enclosure 10. In yet another embodiment, the command module 20 can include switching capabilities, such as low voltage switching capabilities.

The command module 20 is coupled to the tub 18. In particular, the command module 20 can be coupled to a panel 49 of the tub 18 by tabs 24. The tabs 24 can be implemented by a variety of structures. For example, the tabs 24 can be cut out of the panel 49, welded into the tub 18, or the like. Moreover, although the tabs 24 are illustrated as flat, the tabs 24 can be any shape as desired.

Figure 2:
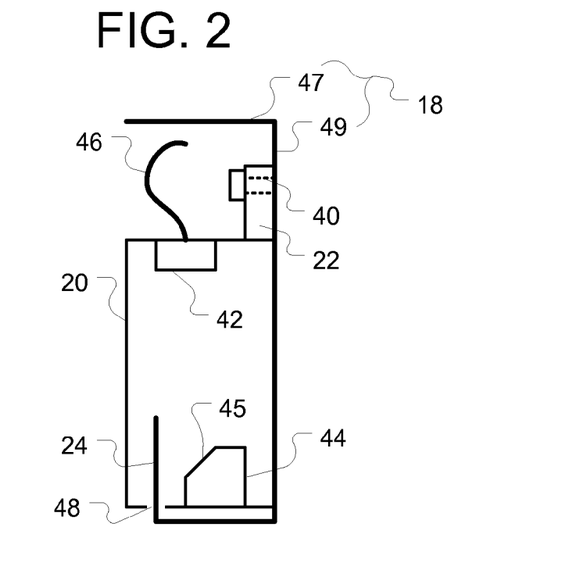
FIG. 2 illustrates a command module installed in the electrical component enclosure of FIG. 1 according to some inventive principles of this patent disclosure.

FIG. 2 illustrates a command module installed in the electrical component enclosure of FIG. 1 according to some inventive principles of this patent disclosure. FIG. 2 is a cross-sectional view along plane 26 of FIG. 1. Referring to FIGS. 1 and 2, the command module 20 includes a slot 48. The slot 48 is configured to receive the tab 24 of the enclosure 10. As will be described in further detail below, the command module 24 is configured to rotate about the slot 48. In particular, the slot 48 can be configured to be wide enough to accommodate movement of the tab 24 in the slot 48 during rotation of the command module 20.

The command module 20 can include a stop 44. The stop 44 can be any variety of structure within the command module 20. For example, the stop 44 can be a tab that is bent about 90 degrees from a housing of the command module 20. In another example, the stop 44 can be a screw, bolt, or other fastener. In another example, the stop 44 can be disposed on a different side of the command module 20 than illustrated, such as the side adjacent to the panel 49 of the tub 18. As will be described in further detail below, the stop 44 can be any structure that can limit an amount of rotation of the command module 20 about the slot 48.

Figure 3:
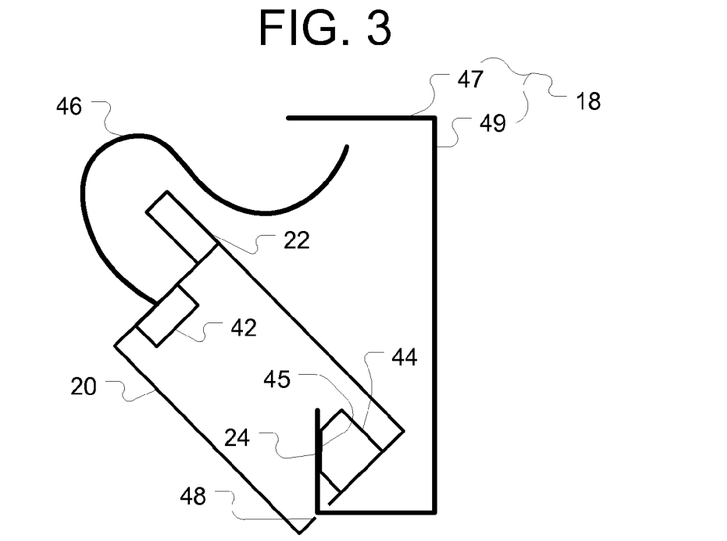
FIG. 3 illustrates the command module of FIG. 2 rotated according to some inventive principles of this patent disclosure.

FIG. 3 illustrates the command module of FIG. 2 rotated according to some inventive principles of this patent disclosure. Referring to FIGS. 2 and 3, the command module 20 is configured to rotate about the slot 48. As the tab 24 is disposed in the slot 48, the command module 20 can substantially rotate about the tab 24. That is, the tab 24 and the slot 44 can create a structure that acts substantially as a hinge. Accordingly, the command module 20 can rotate out of the tub 18 of the enclosure 10. In addition, although rotation has been described, some translation can occur.

In an embodiment, the stop 44 can include a bevel 45. The bevel 45 can be configured such that the bevel 45 is substantially flush with the tab 24 of the enclosure 10 when the stop 44 of the command module 20 contacts the tab 24. Thus, the surface where the tab 24 and the stop 44 interface is substantially an edge of the bevel 45, rather than a point. As a result, wear on the tab 24, the stop 44, or the like can be reduced.

In an embodiment, the stop 44 of the command module 20 can be substantially perpendicular to the tab 24 of the enclosure 10. That is, the force applied to the stop 44 can be substantially perpendicular to a bend that created the stop 44. Thus, the likelihood that contact of the stop 44 and the tab 24 will distort either or both of the stop 44 and the tab 24 can be reduced.

In an embodiment, the command module 20 can include a connector 42 disposed on a side of the command module 20 opposite the stop 44. The connector 42 can be coupled to wiring 46. When the command module 20 is installed as illustrated in FIG. 2, a user may have no direct line of sight towards the connector 42. That is, the tub 18 can include a panel 47 or other structure that substantially overhangs the connector 42. As a result, it can be more difficult to access the connector 42, or any other interface on the same side of the command module 20.

However, once the command module 20 is rotated out of the enclosure 10 as illustrated in FIG. 3, a user can have a direct line of sight towards the connector 42. In addition, the wiring 46 coupled to the connector 42 can have a sufficient amount of slack to accommodate the rotation of the command module 20. Thus, a user can more easily access the connector 42. Although the connector 42 has been given as an example, any interface such as screw terminals, quick connect terminals, buttons, knobs, or the like can be present. Such other interfaces can become more accessible.

In an embodiment, the command module 20 can include a flange 22. As illustrated, the flange 22 can be a handle configured to allow a user to grasp the command module 20. The flange 22 can be disposed on a side of the command module 20 substantially opposite the slot 48. The flange 22 can also be configured to receive a fastener 40 to couple the flange 22, and hence, the command module 20 to the tub 18.

Accordingly, an assembly of a command module 20 into the enclosure 10 can be made easier. For example, a user can pick up the command module 20 by the flange 22. Since the flange 22 can be a handle, the flange 22 can provide an ergonomic structure for the user. The command module 20 can be positioned in the enclosure 10 such that the tab 24 is inserted into the slot 48 of the command module 20. In particular, the user can be holding the flange 22 and rotate the opposite side with the slot 48 towards the enclosure such that the command module 20 is disposed at an angle relative to a panel of the enclosure 10 similar to the angle of FIG. 3. As the panel 47 of the tub 18 does not overhang the command module 20 at this angle, a user can still hold the command module 20 by the flange 22. In other words, with one hand, the user can hold the command module 20, and align the slot 48 with the tab 24. The command module 20 can then be lowered on to the tab 24.

Once engaged, the tab 24 can limit a range of motion of the command module 20. In particular, the module can be released. However, even though the module is released, the combination of the stop 44 and the tab 24 can limit the range of motion of the command module 20 such that the command module 20 remains in the enclosure 10, albeit rotated at an angle. In other words, the user can release the command module 20 then, with both hands free, obtain fasteners, tools, or the like to further assemble the enclosure 10, make connections to the command module 20, or the like The user can push the command module 20 into the enclosure 10. That is, the command module 20 can be rotated such that the command module is substantially flush with the panel 49 of the enclosure 10 as illustrated in FIG. 2. The user can then use one hand to hold the flange 22. The other hand can insert the fastener 40, use a tool to secure the fastener 40, or the like. For example, as the user's hand is on the flange 22, where the fastener 40 is to be inserted, the user can substantially simultaneously keep the command module 20 in place with a slight pressure, and use fingers to aid in aligning the fastener 40. Alternatively, the other hand can be used to start the fastener 40, temporarily holding the command module 20 in place, and allowing the installer to leisurely perform another action. Since the command module 20 is substantially supported by the tab 24 of the enclosure, a pressure applied to the command module can be sufficient to overcome the rotation of the command module and can, but need not, overcome the entire weight of the command module 20, create sufficient friction to hold the command module 20 in place on the panel 49, or the like. Thus, a reduced effort can be used in assembly, installation, or the like.

Although a variety of features of the command module 20 and the enclosure 10 have been described, each of the features can, but need not, be present in an embodiment. For example, in one embodiment, the command module 20 may only include the slot 48 for a corresponding tab 24 of the enclosure 10. In another embodiment, the command module may not have the slot 48, but the command module 20 may have the flange 22 with a handle. Regardless of the combination, the above features can be used to aid in the assembly of the enclosure 10.

Although a command module 20 has been used as an example, other modules can have similar features, such as the flange 22, the stop 44, the slot 48, or the like. Thus, any module that could be installed in the enclosure 10 can be similarly configured for an increased ease of installation. Such a module can, but need not, have any command, control, or other similar functioning.

Figure 4:
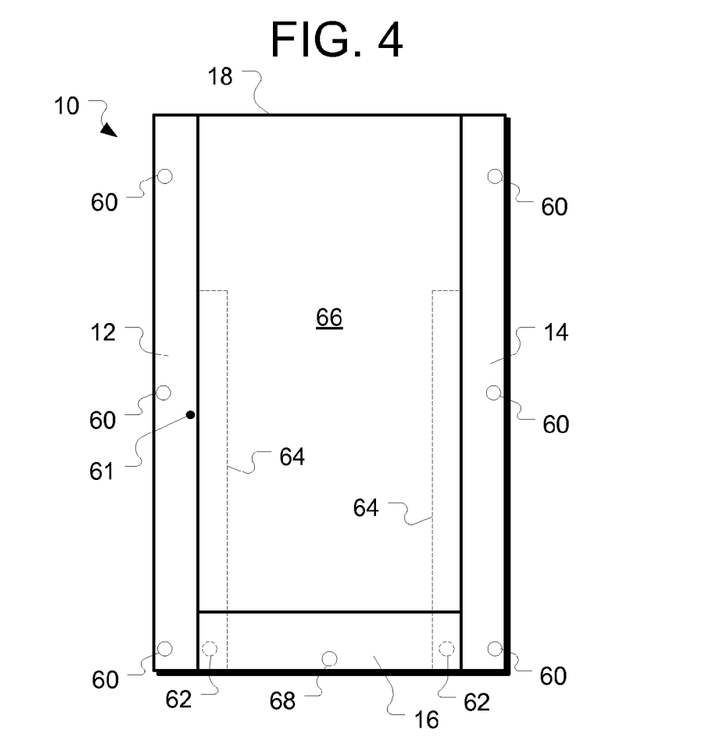
FIG. 4 illustrates a front view of an electrical component enclosure according to some inventive principles of this patent disclosure.

FIG. 4 illustrates a front view of an electrical component enclosure according to some inventive principles of this patent disclosure. In this embodiment the enclosure 10 includes panels 12, 14, and 16. The panels 12, 14, and 16 are coupled to the tub 18 and disposed over an opening of the tub 18. A door 66 can be similarly coupled to the tub 18 and disposed over the opening in the tub 18. Thus, the panels 12, 14, and 16, and the door 66 can substantially close an opening of the tub 18.

In an embodiment, one or more of the panels 12, 14, and 16 can be substantially star convex. As used herein, a panel is star convex if there exists at least one point within the panel from which a line segment to any other point of the shape does not pass outside of the panel. The panel 12 is an example of a panel that is substantially star convex. That is, the panel 12 is not convex as there is a concave portion where the portion 64 joins the remainder of the panel 12. However, the panel 12 is substantially star convex as point 61 can be an end of a line segment to any point of the panel 12 without leaving the panel 12.

As used herein substantially star convex includes shapes that are not strictly star convex. For example, a panel 12 can have openings for fasteners, changes in depth, changes in height, bends, or the like. However, such a panel can still be considered substantially star convex. Moreover, in an embodiment, a panel can be considered substantially star convex if a sheet that was used to form the panel was substantially star convex before bending, rolling, shaping, or the like, regardless of whether the final panel is star convex.

In an embodiment, the panels 12, 14, 16, or the like can be substantially rectangular. For example, the panels 12, 14, and 16 can each be formed from a substantially rectangular sheet. That is, even though the panel may be bent at various angles, since a substantially rectangular sheet was used, the amount of waste is reduced. Panels 12, 14, and 16 could have been formed from a single piece of sheet metal. However, a cutout for the door 66 and/or the electrical switching modules 28 would be removed, creating waste. Moreover, the resulting U-shape can be heavier, bulkier, prone to distortion, or the like as compared with the individual panels 12, 14, and 16. Thus, the use of the panels 12, 14, 16, and the like can reduce waste, allow for single handed installation, or the like.

Figure 5:
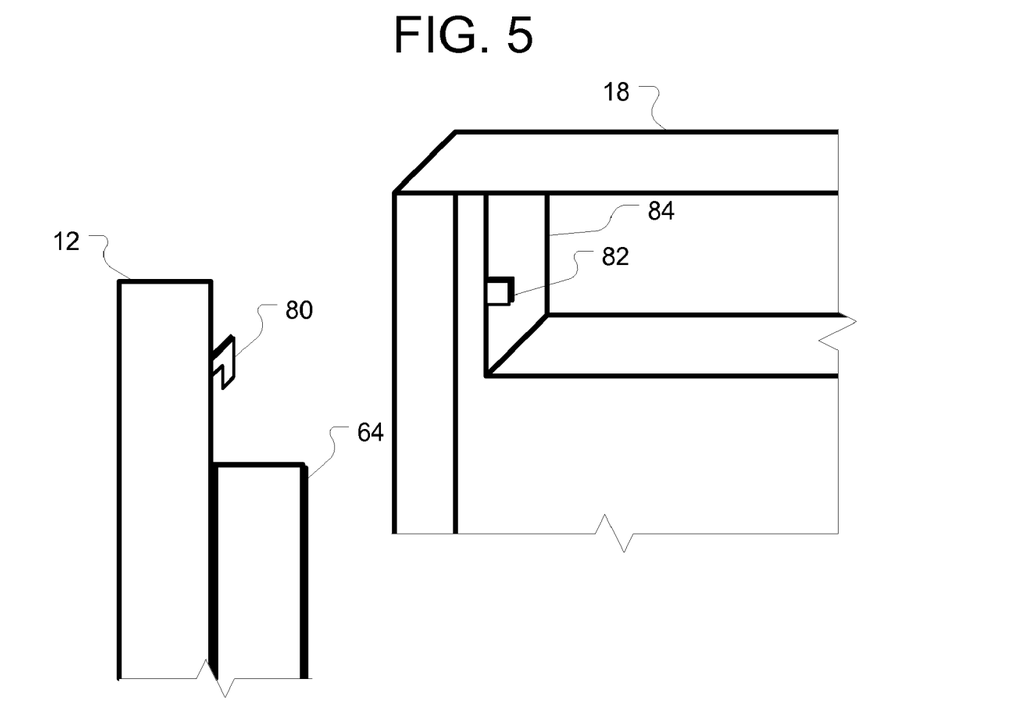
FIG. 5 illustrates an example of an interface of a panel of an electrical component enclosure according to some inventive principles of this patent disclosure.

FIG. 5 illustrates an example of an interface of a panel of an electrical component enclosure according to some inventive principles of this patent disclosure. In this embodiment, the panel 12 includes a hook 80. The tub 18 includes a similar hook 82, tab, or other mating structure to receive the hook 80. In particular, the hook 80 can be disposed substantially on a line including a center of gravity of the panel 12 and is substantially parallel to a major axis of the panel 12. Thus, if the panel 12 is supported by the hook 80, the panel 12 can come to rest such that the hook 80 and the center of gravity create an axis that is substantially parallel to a major axis of the panel 12. That is, the panel 12 can align itself to be substantially where the panel is to be installed.

Figure 6:
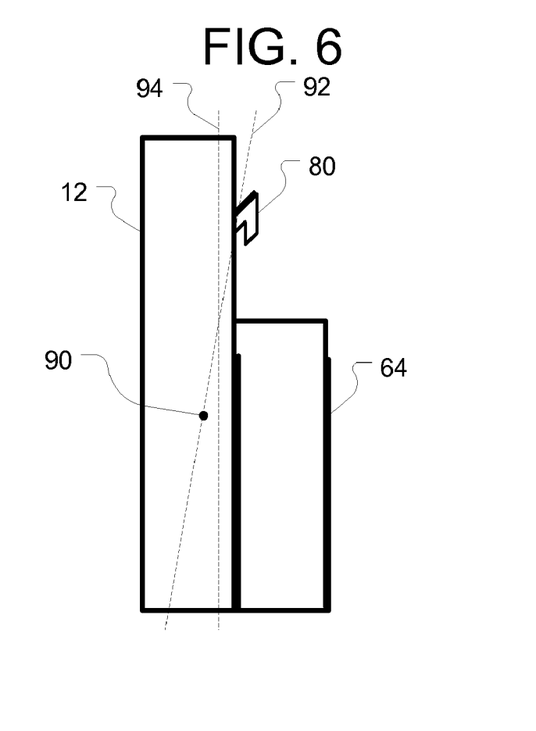
FIG. 6 is an example of a panel for an electrical component enclosure according to some inventive principles of this patent disclosure.

FIG. 6 is an example of a panel for an electrical component enclosure according to some inventive principles of this patent disclosure. In this embodiment, the panel 12 includes the portion 64 that does not extend along the entire length of the panel 12. Thus, the center of gravity 90 can be offset from the major axis 94 of the panel 12.

However, a line 92 created by the center of gravity 90 and the hook 80 can be substantially parallel to the major axis 94. Thus, when the hook 80 is used to support the weight of the panel 12, the deflection of the panel 12 from the major axis 94 can be approximately equal to the angular difference between the major axis 94 and the line 92.

As a result, the openings for fasteners 60 in the panel 12 can be substantially aligned with corresponding locations for the fasteners on the tub. Since the axes can be slightly misaligned yet still substantially parallel, one or more of such openings may not align exactly. However, since the majority of the weight of the panel 12 is supported by the hook 80, a reduced fraction of the weight will need to be offset to align the openings for the fasteners 60. That is, in an embodiment, the panel 12 may only need to be swung a few degrees to one side or another with a force less than that to fully support the panel 12 to align the various structures for the fasteners 60.

Figure 7:
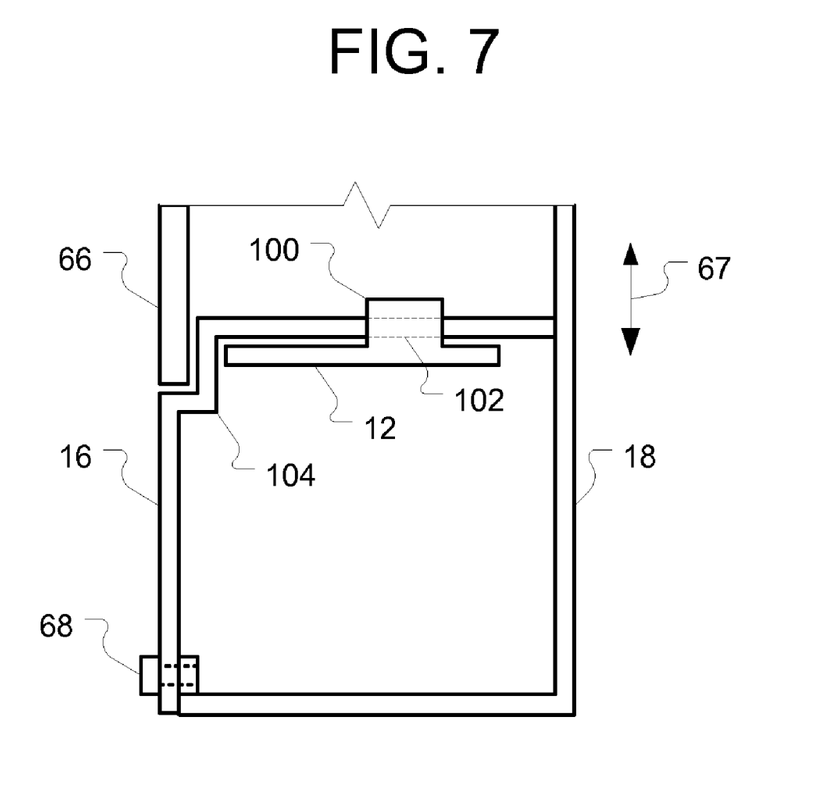
FIG. 7 illustrates an example of an interface of another panel of an electrical component enclosure according to some inventive principles of this patent disclosure.

FIG. 7 illustrates an example of an interface of another panel of an electrical component enclosure according to some inventive principles of this patent disclosure. In this embodiment, the panel 16 includes a slot 102. The panel 12 includes a corresponding tab 100. When assembled, the tab 100 is disposed in the slot 102. The panel 16 can be coupled to the tub 18 by fastener 68. Door 66 is disposed in an angle 104 of the panel 16.

As a result, the panel 16 can be configured to remain in place in particular conditions. For example, a movement of the panel 16 can be limited such that the tab 100 remains engaged in the slot 102. That is, the door 66 can prevent movement of the panel 16 along direction 67. Thus, the panel 16 cannot be disengaged. Even if the fastener 68 is removed, the panel 16 still cannot be removed because of the door.

Although the tab 100 has been described as being on the panel 12, panel 14, or the like, the tab 100 can be disposed on another structure. For example, the tab 100 can be disposed on a structure coupled to the tub 18. In particular, any structure limiting movement of panel 16 such that the panel 16 is mechanically captured by the door 66 can be used.

Moreover, a door 66 can, but need not, be used as the limiting structure. For example, a locking mechanism can be present on the panel 16. Thus, the door 66 can, but need not, mechanically capture the panel 16 as described.

In an embodiment, the panels 12, 14, 16, or the like can cover an opening of the tub 18 and create a smaller opening. For example, the door 66 can cover such a smaller opening. However, the door 66 can, but need not, cover more than the smaller opening. As illustrated in FIG. 4, the door 66 can cover portion 64 of panels 12 and 14, and can cover a portion of panel 16. Thus, the door 66 in this example covers more than the smaller opening.

Referring back to FIG. 4, multiple fasteners are illustrated for the panels 12, 14, and 16. Fasteners 60 are exposed and can couple the panels 12 and 14 to the tub 18. Fasteners 62 can also couple to the corresponding panels 12 and 14 to the tub 18; however, the fasteners 62 are obscured by the panel 16. That is, of the fasteners that couple the panels 12 and 14 to the tub 18, at least one of the fasteners is obscured by the panel 16.

Accordingly, the panels 12 and 14 can be secured near the top of the enclosure 10 by the hooks 80, described above, and secured by the obscured fasteners 62. Thus, the motion of the panels 12 and 14 is limited by structures substantially inaccessible to a user.

In an embodiment, the door 66 can be coupled to the panel 12. For example, hinges can couple the door 66 to the panel 12. Thus, if the motion of the panel 12 is limited, the motion of the door 66 can also be limited. As a result, the motion of the panel 16 is limited, preventing the removal of the panel 16. That is, even if all of the exposed fasteners, including the fasteners 60 and the fastener 68 are removed, the panels covering the opening of the tub 18 can remain substantially secure.

For example, the door 66 can be secured with a lock. As a result, if a user does not have the ability to unlock the door 66 and thus, cannot remove panel 16, the user will be substantially unable to access the interior of the enclosure 10.

Although the panels 12, 14, 16, the door, and the like can be exterior panels and doors, the various structures above can be used on interior panels, doors, and the like. That is, the above arrangement can be used to limit access to a particular space regardless of whether the panels and doors delineate an exterior space from an interior space, different interior spaces from one another, or the like.

In an embodiment, the enclosure 10 can be assembled by hanging the panels 12 and 14 on the tub 18. The panels 12 and 14 can be adjusted and the fasteners 60 and 62 can be installed. At this time, the door 66 may or may not be installed. The panel 16 can then be installed, engaging the tab 100 and slot 102 as described above. A fastener 68 can be installed to fasten the panel 16 to the tub 18. Thus, the panel 16 can be configured to obscure the fasteners 62. The door 66 can then be installed, if the door 66 was not installed before, and the door 66 can be closed and secured. As a result, removal of the exposed fasteners will not allow the panels 12, 14, 16, and/or the door 66 to be removed.

Figure 8:
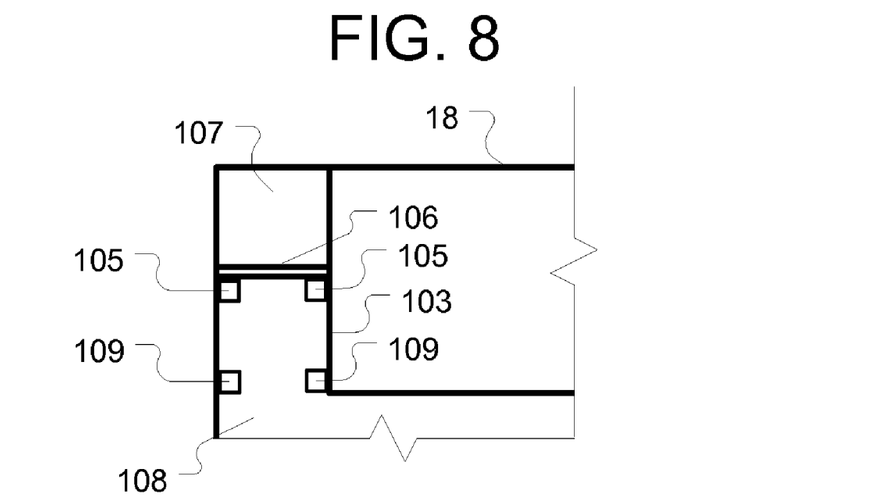
FIG. 8 illustrates a divider of an electrical component enclosure according to some inventive principles of this patent disclosure.

FIG. 8 illustrates a divider of an electrical component enclosure according to some inventive principles of this patent disclosure. In this embodiment, the tub 18 includes a panel 103. The panel 103 can be similar to the panel 84 described above with respect to the panel 12. The panel 103 can include a support 105. Similarly, a panel of the tub 18 can include a support 105. The supports 105 are configured to support the divider 106. When installed, the divider 106 divides a region of the tub 18 into regions 107 and 108. The tub 18, the panel 103, or the like can include knock-out panels such that connections can be made to or through the regions 107 and 108 as desired from outside of the tub 18, inside of the tub 18, or the like. The supports 105 and similar structures can be tabs, ledges, receptacles for fasteners, or the like.

In an embodiment, region 107 can be used as a low voltage region. Region 108 can be a high voltage region. The divider 106 can separate the regions 107 and 108. As the divider 106 may or may not be installed, the character of the different regions 107 and 108 can be configured as desired.

In an embodiment, the tub 18 can include multiple mounting locations for dividers such as divider 106. Additional supports 109 are illustrated without a divider as an example. Thus, in this example, the supports 109 are not, but could have been, used to create an additional region, a larger region, or the like within the tub 18 that are substantially isolated from one another.

Figure 9:
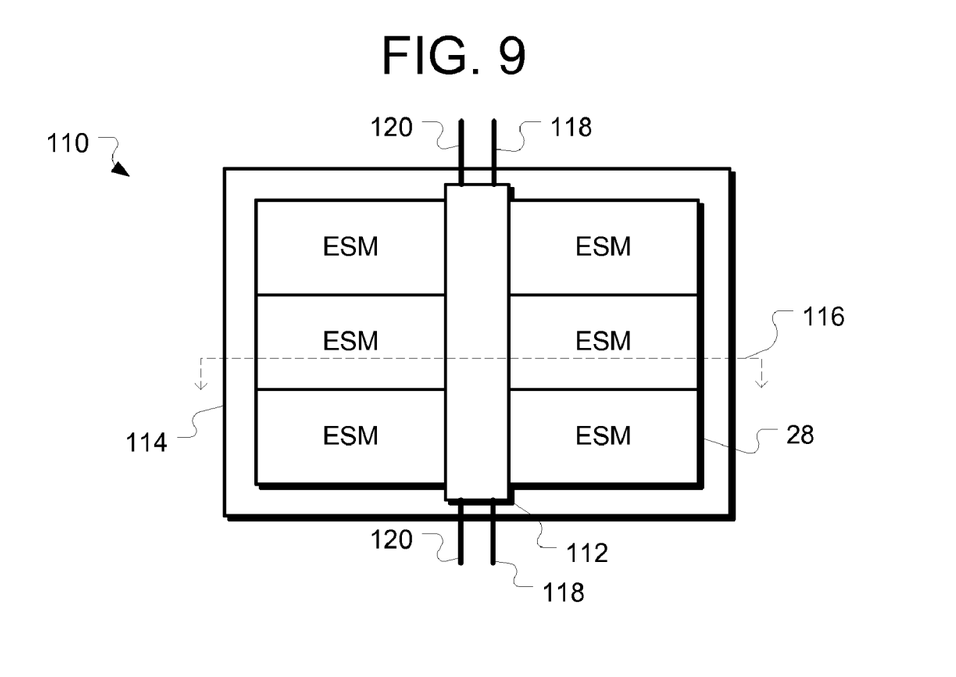
FIG. 9 illustrates a modular mounting structure for an electrical component enclosure according to some inventive principles of this patent disclosure.

FIG. 9 illustrates a modular mounting structure for an electrical component enclosure according to some inventive principles of this patent disclosure. In this embodiment, the modular mounting structure 10 includes a backplate 114. The backplate 114 can include mounting locations for multiple electrical switching modules 28.

Although electrical switching modules 28 have been described as mounted to the backplate 114, other components can be similarly mounted. For example, dummy modules can be mounted if particular modules are not used, needed, or the like. In another example, modules without switching functionality such as command modules, monitoring modules, or the like can be similarly mounted. Electrical switching modules 28 shall be referred to; however, in other embodiments, other modules can take the place of the electrical switching modules 28.

The modular mounting structure 110 can include a channel cover 112 disposed such that the electrical switching modules 28 can be coupled to the channel cover 112. In an embodiment, the electrical switching modules 28 can, but need not, be directly coupled to the channel cover 112. In contrast, the channel cover 112 can enclose wiring such as neutral wiring 118 and communication wiring 120. The wiring 118 and 120 can be coupled to connectors along the channel cover 112 for coupling to the electrical switching modules 28.

Although neutral wiring 118 and communication wiring 120 have been used as examples, other wiring can be routed under the channel cover. For example, the neutral wiring 118 may be routed in a high voltage region of the tub 18 and not under the channel cover 112. In another example, power supply wiring can be routed through the channel cover 112.

Although not illustrated, the wiring 118, 120, or the like routed through the channel cover 112 can, but need not, include connectors for connecting to other modular mounting structures 110, connecting to command modules 20, or the like. For example, the wiring 118 and 120 can include pigtails, screw terminals, quick connect terminals, or the like for connection.

In this embodiment, electrical switching modules 28 are illustrated as installed on opposite sides of the channel cover 112. However, in other embodiments, the modular mounting structure 110 can be formed such that the electrical switching modules 28 are disposed on only one side, on three sides, or the like.

Figure 10:
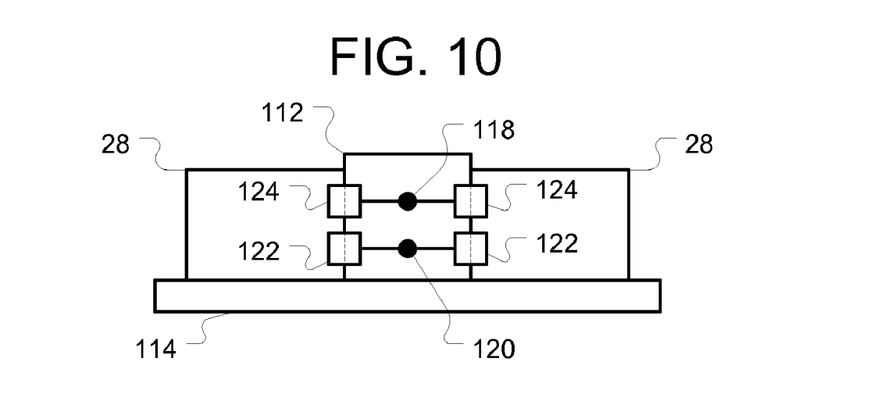
FIG. 10 illustrates a cross-sectional view of the modular mounting structure of FIG. 9.

FIG. 10 illustrates a cross-sectional view of the modular mounting structure along plane 116 of FIG. 9. In this embodiment, the connectors 122 and 124 are illustrated making a connection between the electrical switching modules 28, and the neutral wiring 118 and the communication wiring 120. The neutral wiring 118 and the communication wiring 120 can be disposed to extend along the length of the channel cover 112. Each mounting location for an electrical switching module 28 can include connectors similar to connectors 122 and 124 for connection to the wiring 118 and 120.

Figure 11:
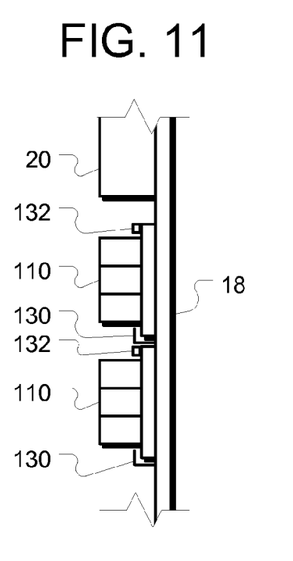
FIG. 11 illustrates a side view of an electrical component enclosure with modular mounting structures according to some inventive principles of this patent disclosure.

FIG. 11 illustrates a side view of an electrical component enclosure with modular mounting structures according to some inventive principles of this patent disclosure. In this embodiment, a side panel of the tub 18 is not illustrated for clarity. Thus, the modular mounting structures 110 can be seen mounted to a backpanel of the tub 18.

In particular, the two modular mounting structures 110 are illustrated along with a command module 20. Each of the modular mounting structures 110 are coupled to a tab 130. The tab 130 can be configured to support the modular mounting structure 110 at a lower edge of the backplate 114. However, in other embodiments, hooks, loops, other tabs, or the like can be used to support the modular mounting structure 110. Corresponding structures can be formed on the panel of the tub 18. In an embodiment, such structures can be configured to substantially support the weight of the modular mounting structure 110 as it is being installed.

For example, the lower edge of the modular mounting structure can be coupled to the tabs 130. As the tabs 130 can substantially support the weight of the modular mounting structure 110, the installer can use a substantially reduced force to hold the modular mounting structure 110 in place. Accordingly, the installer can use a single hand to hold the modular mounting structure 110 in place until fasteners 132 can be installed. In an embodiment, the fasteners 132 can be at an opposite edge from the tabs 130. Thus, the combination of the tabs 130 and fasteners 132 can substantially secure the modular mounting structure 110 to the tub 18.

Once the modular mounting structures 110 are installed, the wiring covered by the channel covers 112 can be coupled together. For example, the neutral wiring 118 and the communication wiring 120 between modular mounting structures 110 can be wired together as can the wiring 118 and 120 between a modular mounting structure 110 and the command module 20. Thus, in this example, neutral connections and communication connections are formed between the electrical switching modules 28 and the command module 20. Although the command module 20 and the modular mounting structures 110 have been illustrated as being coupled in series, such components can be coupled in parallel, in arrays, or the like as desired.

In an embodiment, during the assembly of the enclosure 10, a modular mounting structure 110 can be installed as a unit. That is, the modular mounting structure 110 can be assembled in an offsite location, potentially with reduced labor costs. Instead of wiring up each electrical switching module 110, the installer can wire the modular mounting structures 110 and the command module 20 together, reducing installation labor costs.

Moreover, removal can also have reduced labor costs. For example, a failed electrical switching module 28 can be identified. As used herein, a failure can mean an actual failure, a potential failure, or the like. The modular mounting structure 110 can be removed from the panel of the tub 18. The modular mounting structure 110 can be sent to a repair location for analysis, repair, reconditioning, or the like. In the mean time, another modular mounting structure 110 can be installed in the same location.

Figure 12:
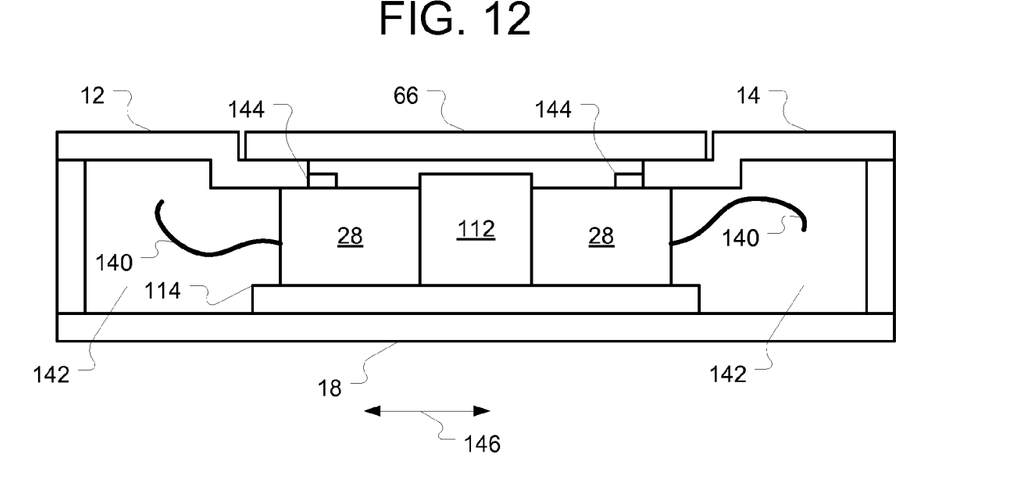
FIG. 12 illustrates a cross-sectional view of an electrical component enclosure and a modular mounting structure according to some inventive principles of this patent disclosure.

FIG. 12 illustrates a cross-sectional view of an electrical component enclosure and a modular mounting structure according to some inventive principles of this patent disclosure. In this embodiment, the electrical switching modules 28 can include a retaining structure 144. The retaining structure 144 is configured to be constrained such that movement of the electrical switching modules 28 in the direction 146 is limited. For example, a panel 12 or 14 can constrain the movement of the electrical switching module 28 along direction 146. That is, the channel cover 112 of the modular mounting structure 110 can prevent the electrical switching module 28 from moving in one direction of the arrow of direction 146 while the panel 12 can be configured to prevent the electrical switching module 28 from moving in the other direction of the arrow of direction 146.

As illustrated, the retaining structure 144 can include a protrusion extending from a surface of the electrical switching module 28. The panel 12 can be disposed on a side of the retaining structure 144 opposite the channel cover 112.

In another embodiment, the retaining structure 144 can include a recessed region within a surface of the electrical switching module 28. The recessed region can be configured to receive a corresponding tab, protrusion, or other structure of the panel 12.

In another embodiment, the retaining structure 144 can include mounting locations for a fastener. For example, a fastener can include a screw, brad, bolt, nut, or the like. The electrical switching module 28 can include a threaded hole configured to receive a screw, for example. Accordingly, the panel 12 can be mounted to the electrical switching module 28 using the retaining structure 144.

In addition to limiting a direction of movement of the electrical switching modules 28, the panels 12, 14, and the like can also create regions for isolation of various wiring. For example, the wiring 140 can include line wiring, load wiring, dimming control wiring, or the like. The tub 18, the electrical switching modules 28, the panel 12, or the like can create region 142 that can substantially isolate the wiring. In particular, even when the door 66 is opened, the wiring can be substantially isolated from a user.

Moreover, the inventive principles of this patent disclosure have been described above with reference to some specific example embodiments, but these embodiments can be modified in arrangement and detail without departing from the inventive concepts. Such changes and modifications are considered to fall within the scope of the following claims.

The invention claimed is:

1. A system, comprising:
an enclosure including:
 a panel; and
 a tab offset from the panel; and
a module including:
 a frame including a slot; and
wherein:
 the module is disposed in the enclosure such that the tab of the enclosure is disposed in the slot of the module; and
 the module is configured to rotate about the slot.

2. The system of claim 1, wherein the module further comprises a stop coupled to the frame.

3. The system of claim 2, wherein:
the stop of the module includes a bevel; and
the stop of the module is configured such that the bevel is substantially flush with the tab of the enclosure when the stop of the module contacts the tab of the enclosure.

4. The system of claim 2, wherein the stop of the module is substantially perpendicular to the tab of the enclosure.

5. The system of claim 2, wherein:
the module includes a connector disposed on a side opposite the stop; and
the enclosure includes a second panel substantially overhanging the connector of the module.

6. The system of claim 1, wherein:
the module further comprises a flange disposed on a side of the module opposite the slot; and
further comprising a fastener configured to coupled the flange to the panel.

7. The system of claim 1, wherein the flange is a handle.

8. A method, comprising:
inserting a tab of an enclosure into a slot of a module such that the module is disposed at an angle relative to a panel of the enclosure; and
releasing the module; and
limiting a motion of the module with a stop of the module contacting the tab.

9. The method of claim 8, further comprising:
rotating the module about the slot such that the module is substantially flush with the panel; and
fastening the module to the panel.

10. The method of claim 8, wherein limiting the motion of the module comprises contacting a bevel of the stop with the tab.

11. An enclosure, comprising:
a tub including an opening;
a plurality of panels coupled to the tub and disposed over the opening; and
a door coupled to the tub and disposed over the opening;
wherein at least one of the panels is substantially star convex.

12. The enclosure of claim 11, wherein for a panel of the plurality of panels:
the panel includes a hook disposed substantially at an end of the panel; and
a line including the hook and a center of gravity of the panel is substantially parallel to a major axis of the panel.

13. The enclosure of claim 11, wherein:
the tub includes a hook corresponding to a hook of the panel; and
when the hook of the panel is engaged with the hook of the tub, locations for fasteners on the panel are substantially aligned with corresponding locations for fasteners on the tub.

14. An enclosure comprising:
a tub;
a first panel coupled to the tub with a plurality of fasteners;
a second panel coupled to the tub with at least one fastener;
wherein the second panel is disposed to substantially obscure at least one of the fasteners coupling the first panel to the tub.

15. The enclosure of claim 14, wherein at least one of the fasteners coupling the first panel to the tub is exposed by the second panel.

16. The enclosure of claim 14, wherein:
the first panel includes a tab;
the second panel include a slot; and
the tab is disposed in the slot.

17. The enclosure of claim 16, further comprising a door disposed to obscure an interface of the tab and the slot.

18. The enclosure of claim 17, wherein the door is disposed such that when the door is closed, a movement of the second panel is limited such that the tab remains engaged in the slot.

19. The enclosure of claim 16, further comprising
a third panel;
a dividing panel; and
a support disposed on the third panel and configured to receive the dividing panel such that the dividing panel substantially isolates a first region of the enclosure from a second region of the enclosure.

20. A method, comprising:
fastening a first panel to a tub with a plurality of fasteners;
fastening a second panel to the tub with at least one fastener; and substantially obscuring at least one of the fasteners fastening the first panel to the tub.

21. The method of claim 20, wherein fastening the first panel to the tub comprises hanging the first panel on a hook of the tub.

22. The method of claim 20, further comprising substantially exposing at least one of the fasteners fastening the first panel to the tub with the second panel.

23. The method of claim 20, further comprising engaging a tab of the first panel with a slot of the second panel.

24. The method of claim 21, further comprising limiting a movement of the second panel with a door such that the tab remains engaged in the slot.

* * * * *